Sept. 1, 1953 M. T. CICHELLI 2,650,670
MOLECULAR FILTRATION
Filed Jan. 26, 1950 4 Sheets-Sheet 1

INVENTOR.
MARIO T. CICHELLI
BY
ATTORNEY

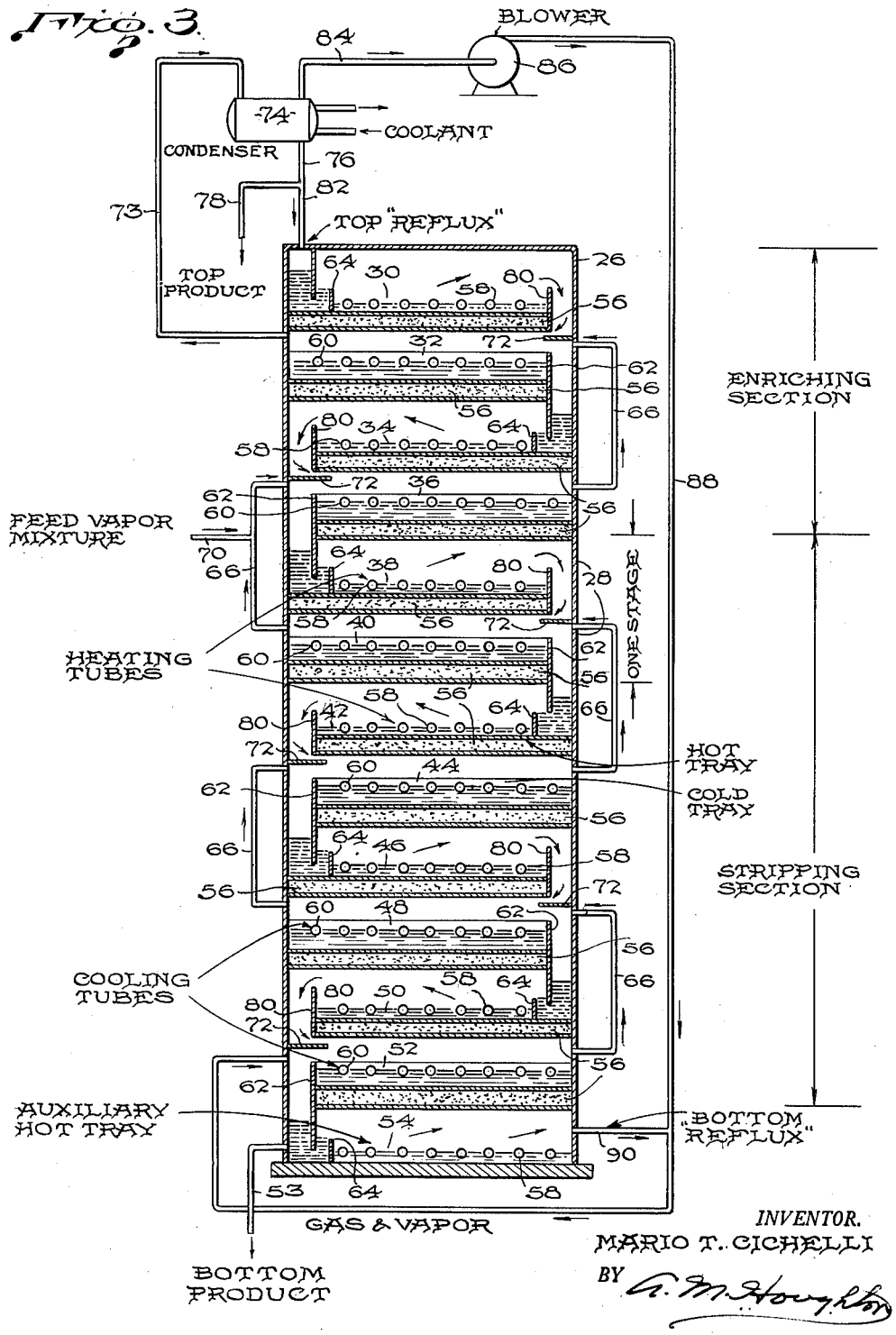

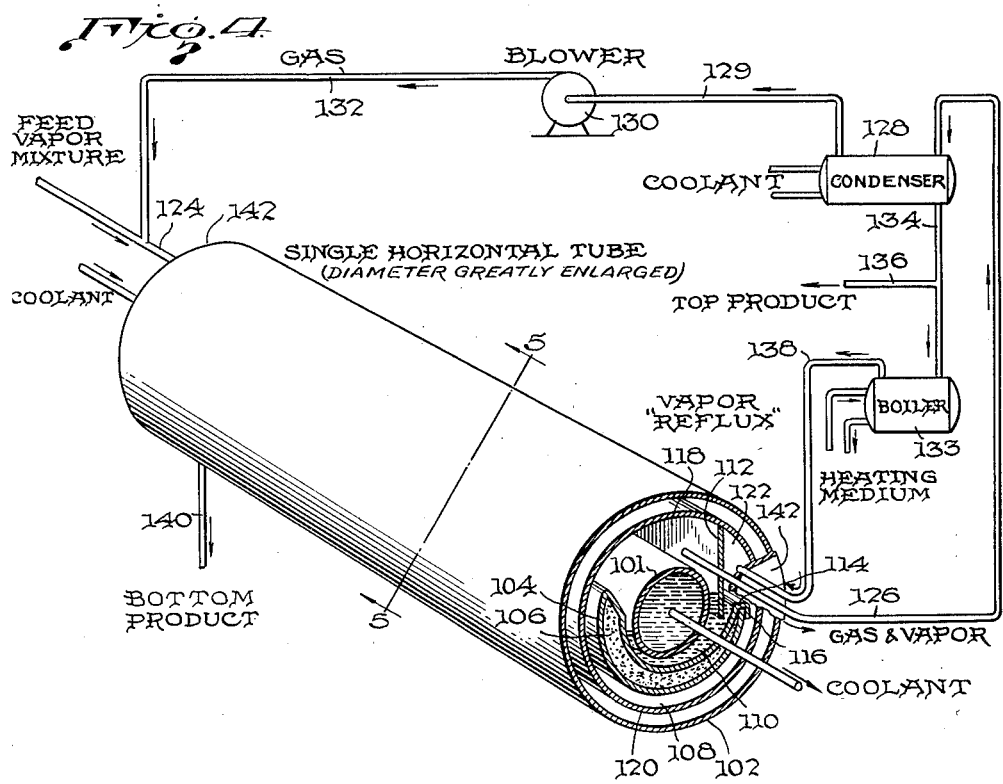
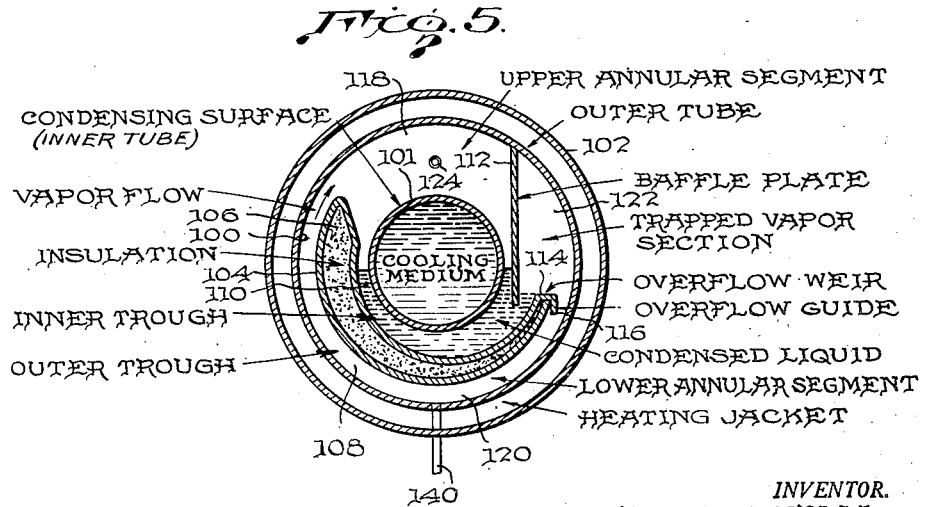

INVENTOR.
MARIO T. CICHELLI
BY
ATTORNEY

Patented Sept. 1, 1953

2,650,670

UNITED STATES PATENT OFFICE 2,650,670

MOLECULAR FILTRATION

Mario T. Cichelli, Wilmington, Del., assignor to Gulf Research & Development Company, Pittsburgh, Pa., a corporation of Delaware Application January 26, 1950, Serial No. 140,733

36 Claims. (Cl. 183—2)

This invention relates to a process for the separation of individual components of vaporous mixtures and more particularly to a method for concentrating a component of a mixture of vapors by a process of molecular filtration of the more diffusible component through a separate filtering or screening gas.

Heretofore the chief method of separating vapor mixtures has been that of fractional distillation, wherein the less volatile component of the vapor mixture to be separated is separated from the more volatile component or components by a process of partial condensation and partial vaporization. The chief disadvantage of this type of process is that it cannot be used to separate vaporous azeotropic mixtures and it is not readily applicable to the separation of vaporous mixtures of isotopes.

This invention differs from ordinary distillation processes in that a separate filtering or screening vapor or gas is employed, through which the more diffusible component of the vapor mixture to be separated passes more readily than the less diffusible component or components.

Other methods heretofore employed to separate vapor mixtures make use of a vapor or gas permeable diaphragm, slit, or membrane through which is filtered the more diffusible component of the mixture to be separated. This type of process requires careful selection of a membrane having pores of a highly critical size. Furthermore, these tiny pores are easily clogged, thus rendering the process inoperative.

This invention differs from the type of process described in the paragraph above in that it employs a dynamic "permeable membrane" comprising a substance in gaseous or vapor form. In other words, the separation is effected by my invention without the use of a membrane, diaphragm, slit, or other substantial hindrance to gas flow.

One object of this invention is to provide a process for separating vapor mixtures, the components of which have varying rates of diffusion through some auxiliary gas or vapor.

Another object is to provide a process by means of which vaporous azeotropic mixtures may be separated.

Still another object is to provide a process by which isotopes in vapor form may be separated.

A further object is to provide a process in which a minimum quantity of filtering or screening vapor is employed and in which said filtering or screening vapor may be used over and over.

A still further object is to provide a diffusional separation process wherein no obstruction to diffusion exists in the separating zone.

Still another object of the invention is to provide a process which will provide a wide scope of cheap and easily obtainable gaseous materials which may be used as the filtering or screening vapor.

An additional object is to provide suitable means for carrying out the process.

Other objects will appear hereinafter.

These objects are accomplished by my invention which comprises a method of concentrating a component of a primary vapor mixture and suitable apparatus therefor, said method including the steps of mixing said primary vapor mixture with a body of a secondary vapor which has a dew-point such that it will not be condensed in appreciable amounts in the presence of the mixture of primary and secondary vapors thus formed, causing at least a portion of the primary vapor to diffuse in a substantially unobstructed path through the secondary vapor, whereby separate portions of the primary vapor mixture enriched respectively in a more diffusible and a less diffusible component of the vapor mixture are formed, condensing said portion richer in a more diffusible component adjacent its place of formation, removing the condensed more diffusible portion and removing in vapor form the portion richer in a less diffusible component from its place of formation, said secondary vapor being sufficiently insoluble in the condensed portion that its rate of removal in vapor form exceeds its rate of removal in the condensate. The process is preferably carried out in such a manner that the temperature of the primary-secondary vapor mixture is above about its dew-point within the separating zone.

In the accompanying drawings I have illustrated suitable apparatus in which my improved process can be carried out. Referring to the drawings:

Figure 3 is a vertical section showing a stagewise column in which the process of molecular filtration takes place in a plurality of single-stage units housed within a single column;

Figure 4 is a diagrammatic elevation partly in section of a differential column apparatus.

Figure 5 is an enlarged cross section of the separating tube taken on line 5—5 of Figure 4.

The principles of the process of sweep diffusion will be briefly discussed hereinafter, but will be found more fully described in the copending application of Bowman and Cichelli, Serial No. 32,916, filed July 14, 1948, now U. S. Patent 2,584,785.

My molecular filtration process is carried out as set forth in the following description with more particular reference to the drawings. In the detailed description below, like characters of reference refer to the same or corresponding elements.

Figure 1:
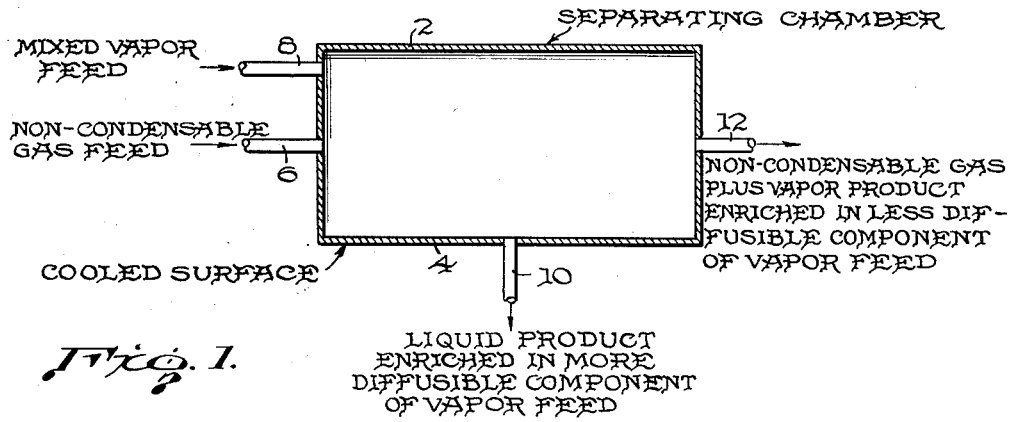
Figure 1 is a diagram illustrating the principles of my single-stage molecular filtration unit.

In Figure 1 the separating chamber is illustrated by numeral 2. One surface of chamber 2, here shown as the bottom surface 4, is cooled. The filtering or screening gas or vapor, hereinafter referred to as the secondary vapor, is fed into chamber 2 through flow line 6. The mixture of vapors to be separated, hereinafter referred to as the primary vapor mixture, is introduced into chamber 2 through flow line 8. Numeral 10 designates a conduit through which the liquid product enriched in the more diffusible component of the primary vapor mixture is withdrawn from the chamber 2. The secondary vapor which also contains therein the portion of the primary vapor mixture enriched with respect to the less diffusible component is withdrawn from chamber 2 through line 12.

It will be noted that the points of entry and exit of the secondary vapor are located at the same distances from cool surface 4. While this is not necessary, it has been shown thus to indicate that a direction of motion perpendicular to the cool surface 4 is not necessary. The point of entry of the primary vapor mixture into chamber 2 has been shown at a position relatively far removed from cool surface 4. This arrangement also is not necessary but is shown and preferred in order to allow a greater space over which diffusion of the components of the primary vapor mixture through the secondary filtering vapor may take place. The point of exit of the secondary filtering vapor from chamber 2 may be located at any point above the surface of the liquid condensed on cool surface 4. However, it is preferred that this point be relatively distant from the surface of the condensed liquid in order to prevent partial condensation of a portion of the primary vapor mixture leaving with secondary filtering vapors and consequent intermixture of this condensate with the condensate on surface 4.

For simplicity of explanation a binary mixture of vapors will be assumed as the primary vapor mixture and a relatively noncondensable gas will be assumed as the secondary vapor. After introduction of the primary vapor mixture into the separating chamber containing the secondary vapor, it will be seen that the molecules of the primary vapor mixture have only two possible ultimate destinations, the first being cooled surface 4 and thence out of the separating chamber through line 10, and the second being line 12. The molecules of the primary vapor mixture having the greater rate of diffusion pass through the secondary vapor faster than the molecules of the less diffusible component of the primary vapor mixture. The rate of diffusion through the secondary vapor depends on the speed of motion and the size of the molecules of the components of the primary vapor mixture. As a result of this differential rate of diffusion a greater portion of the molecules of the more diffusible component reach the cooled surface more quickly than other molecules in the separating chamber. These molecules are condensed at the cooled surface. The secondary vapor containing a portion of the primary vapor mixture enriched with respect to the less diffusible component may then be drawn off from the chamber through line 12. This gaseous mixture may be separated by condensation, if desired. The condensate of this step would be relatively enriched with respect to the less diffusible component. The secondary or filtering vapor, having been chosen as a relatively non-condensable gas, could then be recycled through separating chamber 2, if desired.

Figure 2:
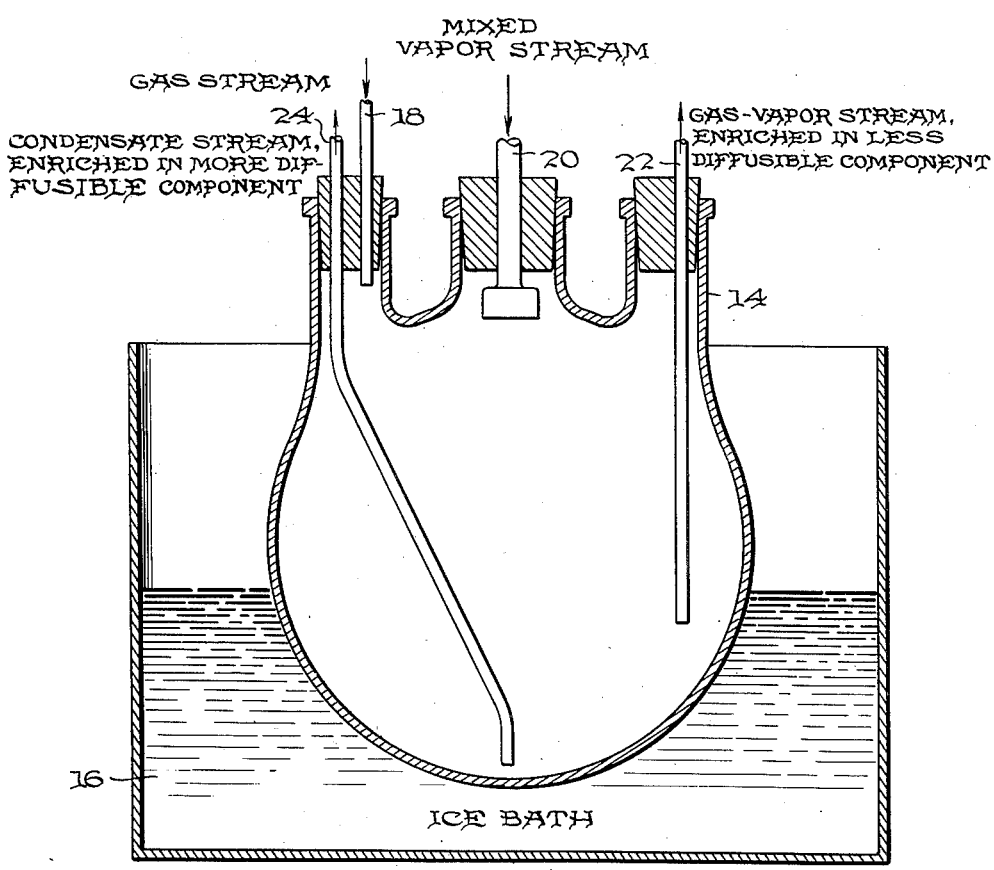
Figure 2 is a vertical section of an experimental single-stage apparatus actually employed.

Figure 2 shows an experimental single-stage molecular filtration unit that has been tested in the laboratory. A 3-necked spherical flask 14 serves as the separating chamber. The lower portion of this flask is immersed in an ice bath 16 to provide a cold condensing surface within the lower portion of flask 14. There are four tubes entering the spherical flask through the three rubber stoppers. The tube 20 passing through the center stopper serves to introduce the vapor mixture to be separated. (The primary vapor mixture.) Noncondensable gas is introduced into the flask through the short tube 18 passing through one of the side stoppers. A longer tube 22, extending about half-way down into the flask through the other side stopper, provides a means for removing noncondensable gas and uncondensed vapor. A still longer tube 24 extends down into the lowermost portion of the flask to provide a means of withdrawing condensed liquid.

An acetic acid-water mixture was used as a primary vapor mixture in experiments to demonstrate that molecular filtration can reverse the direction of separation obtained by partial condensation. Air served as the noncondensable gas. In operation, therefore, air was introduced at a continuous rate through line 18 (except in the case of run 5). Vapors of the acetic acid-water mixture were continuously introduced through line 20. The portion of vapor richer in the more diffusible component (water) was condensed on the lower surface of flask 14, and was withdrawn through line 24. The remaining vapor, comprising the less diffusible component (acetic acid) and air, was withdrawn through line 22 and condensed. The acetic acid-water product mixtures were analyzed with an immersion refractometer. The accuracy of the analyses is estimated to be about ±0.2 weight per cent. The results of the experiments are tabulated below:

TABLE
*Summary of experimental results*

| Run No. | 1 | 2 | 3 | 4 | 5 | 6 |
|---|---|---|---|---|---|---|
| Feed | (1) | (1) | (1) | (1) | (1) | (1) |
| Feed rate, lbs./hr | 0.729 | 2.52 | 2.43 | 2.37 | 0.760 | 0.531 |
| Temperature of Feed, °C | 102 | 102 | 102 | 102 | 102 | 102 |
| Wt. fraction of Feed Condensed | 0.77 | 0.65 | 0.66 | 0.67 | 0.79 | 0.74 |
| Air Rate, std. cu. ft./hr. (measured at 0° C., 1 atmos.) | 11.2 | 11.5 | 11.4 | 11.4 | none | 9.9 |
| Pressure, lbs./sq. in. abs | 15.3 | 15.5 | 15.4 | 15.5 | 15.2 | 15.1 |
| Feed Composition, Wt. Percent Acid | 39.6 | 39.6 | 39.6 | 39.6 | 39.6 | 39.6 |
| Bottoms Composition (Condensed portion) Wt. Percent Acid | 37.7 | 38.1 | 38.1 | 38.1 | 42.2 | 38.4 |
| Tops Composition (uncondensed portion) Wt. Percent Acid | 46.6 | 42.4 | 42.4 | 42.6 | 30.2 | 42.8 |

¹ Acetic acid-water mixture.

Examination of the table shows that in runs 1, 2, 3, 4, and 6 the direction of separation was the opposite of that obtained in run number 5. The condensed portion, in these cases, was poorer in acetic acid than the uncondensed portion. The difference in composition ranged from 4.3 to 8.9 mole per cent.

Examination of the table also shows that in run number 5, wherein no air was introduced, the condensed portion was richer in acetic acid than the uncondensed portion of the vapor by 12.0 mole per cent. The magnitude and direction of composition difference agrees with vapor-liquid equilibrium data for acetic acid-water mixtures. The fact that the bottoms composition of condensate was relatively enriched in the acetic acid in run 5 serves to illustrate the difference between partial condensation and my molecular filtration process. In run 5 the acetic acid, being the less volatile component, condensed on the cool surface of the flask, whereas the more volatile water remained in the vaporous product. However, in the other runs carried out according to the principles of my process the more diffusible water vapor was preferentially concentrated at the condensing surface and preferentially removed as condensate.

It is thus apparent that in a process involving merely partial condensation, as illustrated in run 5, the relative volatilities of the vapor components to be separated are the controlling factors. Since the condensate of runs 1, 2, 3, 4, and 6 is enriched in the more diffusible and more volatile component (water), the reverse of the composition of the condensate obtained in run 5, it is apparent that the rate of diffusion is controlling in my process.

The single-stage molecular filtration process is, in general, not efficient for sharp separations. It is usually preferable to employ multistage separation processes, which may in general be divided into three classes, according to the type of equipment employed. These are as follows:

1. Separate stage processes
2. Stagewise column processes
3. Differential column processes In each case, at least two countercurrently flowing streams are established, one being enriched and the other impoverished, respectively, with respect to one or more components of the mixture undergoing separation.

Separate stage processes are characterized by the fact that a number of discrete single-stage units are employed in the process.

Stagewise column processes are stage processes wherein the contacting stages are located in a single column unit. A bubble-plate distillation column is an example of an apparatus for carrying out a typical stagewise column process.

Differential column processes are processes wherein there are no discrete paths of exchange between the countercurrently flowing streams at points along the column. Instead the preferential transfer of one component to one stream and the other component to the other takes place all along the column. An example of this is the packed distillation column. The differential column process may be distinguished from the single-stage process in that in the column process, the enrichment increases without limit as the length of the path increases, where the ratio of the product streams is held constant.

Most continuous separation processes may be placed in one of the three named classes. In general, separate stage processes entail more expensive construction costs than stagewise column or differential column processes.

Figure 3 shows a vertical section of a stagewise column apparatus in which six single stages are employed in a single column. In this figure numeral 26 indicates a column which is preferably square or rectangular in cross section and which houses six single stages. One single stage is illustrated by numeral 28. Each stage comprises a hot and cold tray, the hot tray being above the cold tray. The hot and cold trays form respectively evaporating and condensing chambers. Each condensing chamber has a vapor inlet and a vapor outlet positioned at opposite ends of the chamber with respect to the path or direction of vapor flow. In order to achieve laminar, longitudinal vapor flow through the condensing chamber, the length of each chamber with respect to the direction of vapor flow should be greater than its depth. Numerals 30, 34, 38, 42, 46, and 50 illustrate the hot trays of the six stages. Numeral 54 denotes an auxiliary evaporating chamber or hot tray whose function will be explained hereinafter. Numerals 32, 36, 40, 44, 48 and 52 designate the cold trays of the six stages. The bottom of each of the trays of the various stages is double walled. Between the double walls insulating material is placed, as illustrated by numerals 56. The function of the insulating material is to prevent inefficient heat exchange throughout the apparatus. The evaporating chambers above-described are heated by means of heating tubes designated by numerals 58, whereas the above-mentioned condensing chambers are cooled by cooling tubes 60. Numerals 62 denote the liquid retaining weirs or overflow barriers for the individual cooling trays. These barriers together with the common housing for the stages form passageways for the overflowing condensate. Each passageway is located near the vapor inlet end of the condensing chamber and serves to conduct liquid condensate to the corresponding end of the next previous or lower evaporating chamber. The number 64 refers to a weir for hot tray 34 which is located at the bottom of the passageway described immediately above. Each of the hot trays contains a similar barrier 64 which, together with the liquid condensate passageway, forms a trap to prevent vapor backflow. The condensing chambers of the individual stages are connected together by means of outside conduit lines shown by numerals 66. These conduit or flow lines connect the vapor outlet of each condensing chamber to the vapor inlet of the next beyond or above condensing chamber. The means for introducing the primary vapor mixture into the secondary vapor is here shown by conduit 70. Baffles between the hot trays and cold trays are indicated in the drawing by numerals 72. These baffles are provided to prevent turbulence between the oppositely flowing gas-streams. Numeral 80 designates a liquid retaining barrier in evaporating chamber 34. Together with the column wall this barrier forms a vapor passageway for introducing evaporated condensate into the next previous or lower condensing chamber at a point near the vapor inlet of that condensing chamber. The other evaporating chambers are provided with similar barriers.

The primary vapor mixture may be introduced into the separating chamber at any desired elevation, depending upon the type of separation desired. Above the point of introduction the condensate is enriched with respect to the less diffusible component. Below the point of entry the condensate is stripped of the less diffusible component. For convenience the portion of the separating chamber above the point of introduction will be referred to as the enriching section and the portion of the column below the point of introduction of the primary vapor mixture will be referred to as the stripping section.

In operating the apparatus illustrated in Figure 3, the primary vapor mixture to be separated, which will be assumed to be a binary vapor mixture for simplicity of explanation, is introduced into the flowing stream of secondary vapor through conduit 70. From this point the primary-secondary vapor mixture thus formed passes into the condensing chamber formed by cooling tray 36. The more diffusible component of the primary vapor mixture passes through the secondary vapor more readily, whereupon it reaches the cool surface of the condensed liquid in cooling tray 36 and is condensed. The remaining vapor, enriched with respect to the less diffusible component, passes out the opposite end of the chamber formed by cooling tray 36 through flow line 66 into the chamber formed by cooling tray 32, where the separation process is repeated.

When cooling tray 32 becomes full of condensed liquid, said liquid overflows past weir 62 into a down-comer or passageway and thence past a weir 64 into the heating tray 34. The heating tubes in this chamber cause this condensate to be revaporized, whereupon the vapors thus produced pass through a vapor passageway to the condensing chamber 36 below. Baffle 72 imparts a directional flow to these vapors and prevents turbulence at the point of intermixture of these vapors with the upwardly flowing vapor from flow line 66. By the structure shown the evaporated condensate is caused to enter the next previous condensing chamber at a point near the vapor inlet of that condensing chamber. Upon entering the chamber above the cooling tray 36, the revaporized condensate is mixed with the primary-secondary vapor mixture and undergoes a further separation.

The liquid well formed by the downcomer and heating tray weir 64 provides a trap to prevent the re-evaporated condensate from passing upwardly. The same effect is produced in each of the stages by means of corresponding structure.

The portion of the primary-secondary vapor mixture which is not condensed in cooling tray 32 passes out of this last condensing chamber into a flow line 73 leading to condenser 74, where the secondary vapor and condensable vapor mixture are separated. The condensate obtained in this step may be drawn off through lines 76 and 78 from the condenser as top product, which is relatively enriched with respect to the less diffusible component. A portion of the condensate, however, is returned to hot tray 30 through line 82 as top reflux. By the term "reflux" I mean material comprising components of the primary vapor mixture, that is returned to the column in either the liquid or gaseous state. The return of a portion of the condensate to the hot tray is desirable in order to provide a downwardly flowing stream of primary vapor material so that a countercurrent flow of material to be separated may be maintained in the column at all times. The secondary or filtering vapor, which has been regenerated in condenser 74, is drawn off through line 84 and is returned by means of blower 86 through flow line 88 to the first condensing chamber formed by cooling tray 52.

The portion of condensate contained in cooling tray 52 has reached this point by continuous operation of the separation process through the various stages above this tray. The condensate at this point is relatively enriched with respect to the more diffusible component of the primary vapor mixture and is stripped of the less diffusible component or components. When the tray is full it overflows into its adjacent passageway or downcomer from whence a portion of it may be drawn off through line 53 as bottom product enriched with respect to the more diffusible component. The remainder of this condensate is allowed to return to another evaporating chamber formed by auxiliary heating tray 54 where it is revaporized and introduced into flow line 88 by means of line 90, where it is mixed with the regenerated secondary vapor passing through line 88. The mixture of evaporated material, hereinafter termed "bottom reflux" and the regenerated secondary vapor are then reintroduced through line 88 into the chamber above cooling tray 52 where the separation process continues. This return of bottom reflux vapor is desirable in order to produce a continuous upward flow of primary-secondary vapor mixture and thereby to maintain a continuous countercurrent flow of material to be separated throughout the various stages of the column.

It will be apparent that at all times during the operation of the process a continuous flow of primary-secondary vapor mixture is passing upwardly over the cooling trays and through the outside flow lines throughout the column while a continuous flow of condensate is passing downwardly.

In any given stage there are at all times four flow streams entering and leaving the stage. They are as follows:

(a) A liquid condensate stream flowing downwardly from the condensing tray above, (b) A primary-secondary vapor mixture flowing upwardly from the stage below into the separating zone, (c) A liquid stream overflowing from the cooling tray of the stage and flowing down to the stage below, and (d) A primary-secondary vapor mixture flowing from the separating zone of the stage upwardly through the outside flow line to the stage above.

Upwardly flowing streams are being continually enriched with respect to the less diffusible components and the downwardly flowing streams are being continually enriched with respect to the more diffusible component. Thus, it will be seen that the composition of the condensate contained in the cooling tray lowest in the column will be most enriched with respect to the more diffusible component while the condensate contained in the cooling tray highest in the column will be most enriched with respect to the less diffusible component. The condensate trays of the stages in between contain condensates having compositions of all degrees between these two extremes.

The column in the instant modification is preferably square or rectangular, having a plurality of outside flow lines connecting the various stages on opposite sides of the column. However, columns having other shapes, such as circular, may be used.

Since the streams are progressively enriched with respect to either less diffusible or more diffusible components as they flow upwardly or downwardly, it will be apparent that a sharper separation will be obtained with an increasing number of stages.

Figure 4 illustrates an apparatus for carrying out a differential column process of molecular filtration. This process is distinct from the stagewise column process in that no discrete transfer streams exist for the length of the column. The column shown in Figure 4 is an enricher alone, with feed entering at one end rather than at an intermediate point along the column. If both an enriching and stripping section are desired, it would be more convenient, in this particular type of apparatus, to have two separate units connected in cascade. Alternatively, if a single column is used the primary-secondary vapor mixture could be introduced into the separating chamber at some point intermediate of the ends of the column.

Adhering to the nomenclature that the "top" product end of the unit is the end toward which the primary-secondary vapor mixture is flowing, the secondary vapor, for the sake of simplicity a relatively noncondensable gas, would be introduced at the bottom product end of the stripper and would flow through the stripper and the enricher, and finally leave with the top gas-vapor stream. It is felt, however, that a description of the enriching section alone, shown in Figure 4, is sufficient to illustrate the principles of the differential column process.

To describe the structure of the enriching column of Figures 4, attention is momentarily drawn to Figure 5, which illustrates a cross section of this column. Numeral 100 designates the evaporating surface of the column. This cylinder, here shown as tubular, is heated on its entire surface. Heating may be accomplished by circulating a suitable heating medium, gaseous or liquid, in the space between cylinder 100 and its outer jacket 102. Positioned within and concentric with cylinder 100 is an inner cylinder 101, also shown as tubular, preferably substantially co-extensive with the outer cylinder, which serves to convey the cooling medium through the column. The outer area of this cylinder or tube acts as the condensing surface. In order to achieve a longitudinal vapor flow through the column the co-extensive length of the two cylinders should be greater than the difference between their radii. Numeral 104 denotes a semicircular double-walled dividing member located in a position intermediate of the inner cylinder and outer cylinder. Between the double wall is placed insulation 106. The inner wall of this dividing structure is somewhat eccentric with respect to the outer wall and consequently produces a somewhat eccentric inner trough 110. The outer wall of the dividing structure creates the outer trough 108 between itself and outer tube 100. The double-walled dividing member is mounted in such a manner that the liquid retained on its upper surface and the thinnest portion of the member is below the center of the column while the thickest portion is above the center of the column. Baffle plate 112 is shown as mounted at one edge on tube 100 and extending downwardly in a vertical direction at one side of the inner tube. Its opposite edge is located below overflow weir 114, but without touching the inner wall of the dividing structure 104. The baffle plate is also substantially coextensive with the inner and outer cylinders. Overflow guide 116 extends downwardly from overflow weir 114. The function of this guide is to cause the overflowing liquid to drop to the heated surface of the tube 100 as quickly as possible, so that a greater surface may be employed to revaporize said overflowing condensate. Baffle plate 112 together with overflow weir 114 forms a trapped vapor section 122 by dividing the upper annular segment or diffusion chamber from the vaporizing segment below. These segments are separated on the overflow side only, since it is desired to re-introduce the evaporated condensate into the upper segment on the other side of the column. The mixture of primary and secondary vapors is introduced at one end of the column through line 124 into upper annular segment 118. The revaporized condensate exists in lower annular segment 120. The column is closed at each end by end plates 142, one of which is shown, partly broken away, in Figure 4.

Returning now to Figure 4, in order to describe the operation of the device, the primary vapor mixture is introduced into the upper annular segment through flow line 124. Prior to the entry of the primary vapor mixture into the column, a secondary vapor, here assumed to be a relatively noncondensable gas for ease of explanation, is introduced through line 132 into the flow line 124, thus forming a primary-secondary vapor mixture. As this mixture enters the column the more diffusible component of the primary vapor mixture passes through the secondary vapor and is caused to condense on cooling surface 101. As the primary-secondary vapor mixture passes through the length of the upper annular segment 118 this mixture is continually enriched with respect to the less diffusible component of the vapor mixture, while the more diffusible component is caused to condense along the length of cooling tube 101. At the opposite end of the column the remaining uncondensed primary-secondary vapor mixture is withdrawn from the upper annular segment 118 into flow line 126 and thence to condenser 128 where the remaining vapor portion is condensed. This condensate is relatively enriched with respect to the less diffusible component. The regenerated secondary vapor passes out of condenser 128 into line 129 and thence into blower 130. The vapor is then reconveyed through line 132 to flow line 124. The condensed vapor contained in condenser 128 is withdrawn through lines 134 and 136 as top product, with the exception of a portion of the condensate which is revaporized in boiler 133 and returned through line 138 to trapped vapor section 122 as vapor reflux.

As the condensate continues to collect in inner trough 110 throughout the length of the column it eventually overflows (and passes by means of gravity) into lower annular segment 120, where it is revaporized. This revaporized condensate is caused to flow countercurrent to the principal primary-secondary vapor mixture flow. The impetus from which the backward flow of the revaporized condensate is obtained is created by the force of the vapor reflux being introduced into trapped vapor section 122. Since the most diffusible vapor molecules are condensed earliest in the column, with respect to the direction of vapor flow, it is obvious that the composition of the condensate nearest the point of entry of the feed vapor into the column is richer with respect to the more diffusible component than is the condensate collected at the opposite end of the column, with all degrees of composition in between. By the continuous countercurrent recirculation of the vaporized condensate, the more diffusible component is continually condensed at a position in the column nearer the point of entry of the vapor mixture. The condensate most enriched with respect to the more diffusible component may be withdrawn through line 140 as bottom product from the vicinity of its place of formation, which is here shown at the end of the column away from which the vapor is flowing. Line 140 is joined to cylinder 100 in order to withdraw the condensate contained in outer trough 108 which has overflowed from inner trough 110.

Since the composition of the condensate varies between one end of the column and the other it will be seen that a sharper separation may be obtained with an increasing length of column.

If the top product rate is always less than the vapor flow rate in the upper annular segment, then there is a return flow of the components to be separated across any plane perpendicular to the axis. This flow rate is equal to the forward flow rate minus the top product rate. In order for an enriching column to operate properly, the forward flow of vapor in the annular segment must always exceed the top product rate, otherwise there would be no return stream, or reflux, to carry back the more diffusible component of the forward flowing stream. The liquid in the inner trough has no appreciable motion parallel to the axis of the tube, and, as a matter of fact, in very long units, baffles should be provided, passing through the liquid perpendicular to the longitudinal axis of the column, so as to minimize the tendency toward longitudinal flow of liquid due to variations in level of the long tube. In any event, the backward flowing stream will flow mainly in the lower annular segment, and almost entirely in the vapor phase.

Although considerable variation in design of the column may be tolerated without destroying the efficiency of the separation completely, the device of optimum design would be such that the backflowing vapor would enter the separating zone in the upper annular segment at the place where its composition is identical to that of the vapor in the forward flowing primary-secondary vapor stream. This can be accomplished by adjusting the operating conditions and the ratio of cross sectional areas in the upper and lower annular segments. To increase the capacity of the apparatus a number of tubes may conveniently be connected in parallel in a tube bundle.

Figure 6:
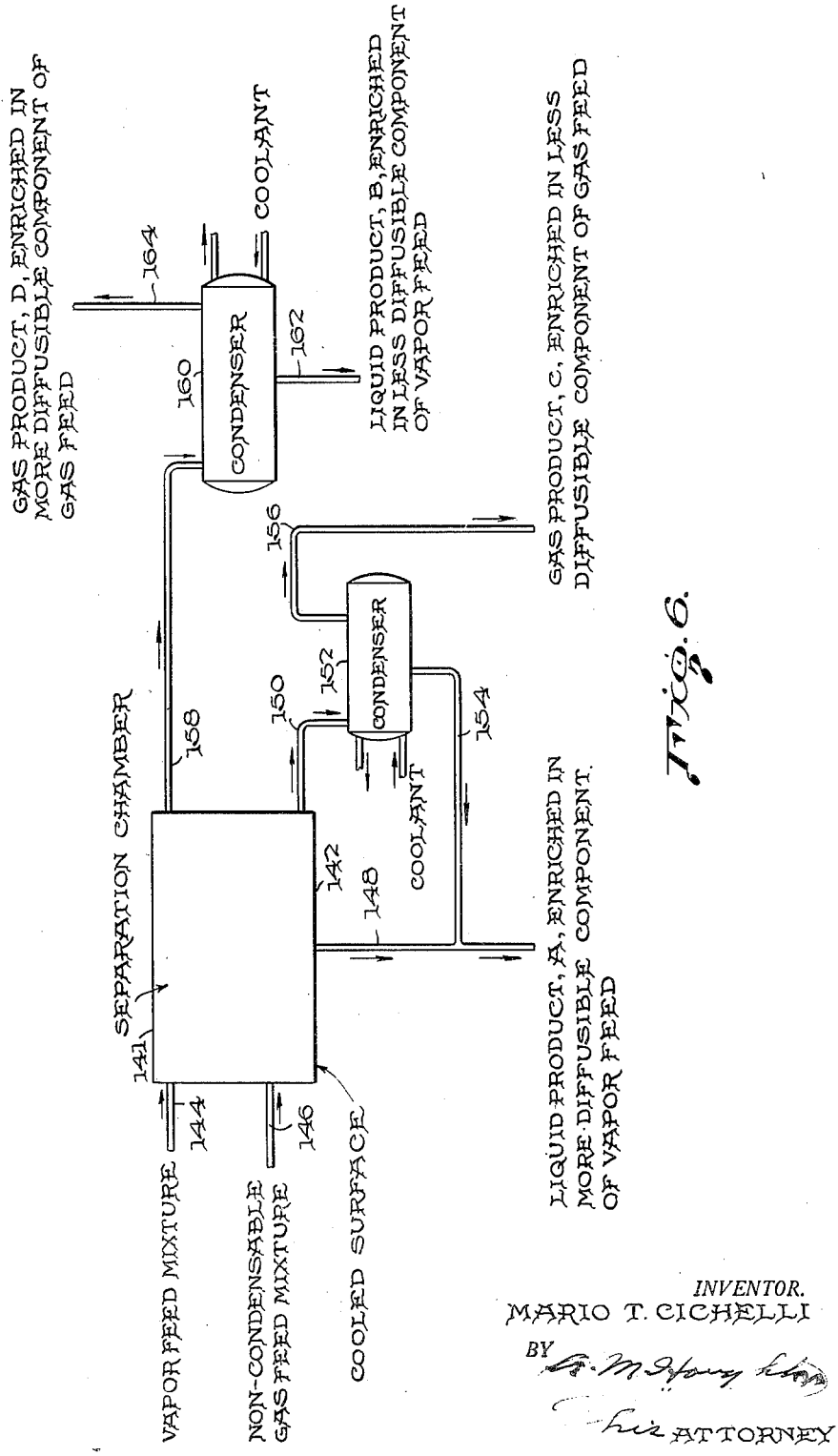
Figure 6 is a diagram of apparatus effecting simultaneously a single-stage combination sweep diffusion-molecular filtration process.

Figure 6 shows a diagram of single-stage combination sweep diffusion-molecular filtration apparatus, for the purpose of simultaneously separating a mixture of gases and a mixture of vapor.

The sweep diffusion process for the separation of mixtures of gases by the molecularly selective sweeping action of a condensable vapor diffusing through the gas mixture to a condensing zone has been described in detail in the aforementioned Patent No. 2,584,785. That process differs from molecular filtration in that the medium used to effect the separation in sweep diffusion (the sweep vapor) must condense in the separating zone, whereas in molecular filtration the medium that is used to effect the separation (the noncondensable gas) is retained in the gaseous phase. Also in sweep diffusion, the medium undergoing separation does not ordinarily condense in appreciable quantity during the process. In molecular filtration, however, a portion of the medium undergoing separation must condense.

In Figure 6 the separation chamber is represented as an enclosure 141 of rectangular cross section, its bottom wall 142 being cooled. The relative location of the feed vapor and gas streams can be varied considerably without destroying the separation obtained. However, for best operation, the mixed vapor feed line, shown at 144, should be located further from the condensing surface than the mixed gas feed line, shown at 146. Considering the vapor and gas feeds as binary mixtures, a portion of the vapor diffuses through the noncondensable gas mixture and condenses on the cold surface 142. This condensed liquid is enriched in the more diffusible component of the vapor, and is withdrawn from the bottom of the separating chamber through conduit 148. In diffusing through the noncondensable gas mixture toward the cold wall, the vapor preferentially carries or sweeps the less diffusible molecules of the gas towards the cold wall also. A gas-vapor stream is withdrawn from the end of the separation chamber opposite the end at which the gases and vapors were introduced in the chamber, through a conduit 150 which is near the cold wall 142, and is caused to pass into a condenser 152. This condenser serves to remove the small amount of vapor present in this stream and to send the liquid so formed through line 154 to join the liquid withdrawn from the bottom of the separation chamber through line 148. The combined liquid stream forms liquid product A, enriched with respect to the more diffusible component of the vapor feed. The uncondensed gas leaving condenser 152 through line 156 is gas product C, enriched with respect to the less diffusible component of the gas feed.

A second gas-vapor stream is withdrawn from the separation chamber through flow line 158 which is further removed from the condensing surface 142 than line 150. This stream is passed through line 158 to condenser 160, where the gas and vapor are separated from each other by condensation of the vapor. The liquid so formed is withdrawn through line 162 as product B, enriched with respect to the less diffusible component of the vapor. The noncondensable gas leaving condenser 160 through conduit 164 is gas product D, enriched with respect to the more diffusible component of the gas feed.

An example of a workable separation is one in which an acetic acid-water mixture comprises the mixed vapor feed, and a hydrogen-methane mixture comprises the mixed gas feed. Liquid product A would be an acetic acid-water mixture having a higher water composition than the feed; liquid product B would be an acetic acid-water mixture having a higher acid composition than the feed; gas product C would be a hydrogen-methane mixture having a higher methane composition than the feed, while gas product D would be a hydrogen-methane mixture having a higher hydrogen composition than the feed.

It will be noted that in each of the particular descriptions concerning the various modifications set forth hereinbefore, the condensation of the portion of the primary vapor enriched with respect to the more diffusible component takes place immediately adjacent to its place of formation, or within the separating zone or chamber itself. This is an extremely important facet of my invention, since by this means I have been able to reduce the amount of filtering vapor employed. To clarify, after the portion of primary vapor near the condensing surface has been condensed, the secondary, or filtering, gas or vapor, remains in the chamber to effect a further separation of the components. Thus the capacity of a given apparatus may be increased without increasing the amount of secondary vapor employed.

The fact that the condensation takes place within the separating chamber is of further importance, since after condensation of a portion of the primary vapor occurs, the remaining primary vapor may be further purified within the separating chamber by subsequent diffusion through the same secondary vapor and condensation of the diffused portion on the condensing surface. A more complete separation is thereby produced.

As hereinbefore stated, another important feature of my invention is that the separation takes place by diffusion of the more diffusible component of the mixture of vapors to be separated through a filtering vapor and in the absence of any slit, porous boundary, membrane, or other substantial obstruction to gaseous flow. The importance of this aspect of my invention lies in the fact that the capacity of any given apparatus for carrying out my process is increased substantially. This is true, since, where a porous boundary is employed, only a small amount of diffusion through the boundary occurs during the passage of a large amount of the vapor mixture past said boundary. In my process, where the boundary is gaseous, the entire amount of the vapor mixture to be separated has the opportunity to undergo separation within the chamber.

The term "condensation," used in the description of this process, is intended to include any means of passage from the vapor phase into a liquid or solid phase. Thus, absorption in a liquid, ordinary condensation to a liquid, freezing to a solid, and adsorption on a solid are all adequate means of condensation in molecular filtration. The greater difficulty of continuously withdrawing a solid product stream renders the methods of freezing to a solid and adsorption on a solid relatively less important.

With respect to the selection of materials which are operative as components of my primary vapor, I contemplate using any material which may be converted into vapor form, whether organic or inorganic, whether normally solid, liquid or gaseous, and whether the substance has a high or low vapor pressure. Therefore, by the term "vapor" as used throughout the specification and claims I mean a substance answering to the above description. The primary vapor mixture may be made up of any two or more materials in vapor form. The secondary vapor may comprise one or more of these materials in vapor form, provided that its dewpoint is such that it will not be condensed in appreciable amounts in the presence of the primary-secondary vapor mixture formed and provided that the secondary vapor is sufficiently insoluble in the condensed portion that its rate of removal in vapor form from the separating zone exceeds its rate of removal in the condensate.

In the molecular filtration process the first proviso with regard to selection of the secondary vapor is easily observed, for example, by selection of a secondary or filtering vapor which is a normally gaseous substance to be used with a primary vapor mixture whose components are normally liquid substances. Consequently, this type of separation is preferred. If the condition described above is not observed, the secondary or filtering vapor will be caused to condense along with the components of the primary vapor mixture thus rendering the separation process inefficient.

The second proviso as regards the selection of the secondary vapor is observed by avoiding the use of a secondary vapor which is highly soluble in whatever liquid phases are formed during the process. For example, HCl or $NH_3$ gas would be unsatisfactory as a secondary or filtering vapor in the separation of a primary vapor mixture, where the condensed phase comprises water. The HCl or $NH_3$, being easily soluble in water, would be dissolved in the condensate and inefficient separation would result. On the other hand, HCl or $NH_3$ gas would be very satisfactory as a secondary vapor in the separation of, for example, two normally liquid nonpolar, water-immiscible, saturated, aliphatic hydrocarbons. It is preferred to employ a secondary or filtering vapor which is soluble to a negligible extent in whatever condensed phase exists in the separating zone. However, the separation will proceed as long as the secondary vapor is sufficiently insoluble in the condensed portion that its rate of removal in vapor form from the separating zone exceeds its rate of removal in the condensate.

Concerning the operating conditions of my process, it is desirable to maintain the primary-secondary vapor mixture within the separating chamber at a temperature above the dew-point of said primary-secondary vapor mixture, except at the condensing surface. This condition may be observed in my process by:

(1) Heating the primary vapor mixture, prior to its introduction into the secondary vapor, to a degree sufficient to produce a primary-secondary vapor mixture having a temperature above its dew-point after intermixture of the two.

(2) Heating the secondary vapor, prior to its intermixture with the primary vapor mixture, to the degree described above.

(3) Heating the primary-secondary vapor mixture to a temperature above its dew-point before introducing it into the separating zone.

(4) Operating at an adequately high condensing surface temperature.

If the described temperature maintenance is not observed, fog formation will occur. Fog formation in the gas-vapor space is undesirable in molecular filtration since the fog droplets would tend to be carried by the diffusing vapor toward the condensing surface, regardless of their composition. This would reduce the efficiency of the separation by an amount depending on the extent to which the primary vapors are condensed in the gas-vapor space. By operating the process as described above I avoid fog formation, since the temperature exceeds the dew-point of the primary-secondary vapor mixture at all points within the primary-secondary vapor space, except at the condensing surface. However, it should be emphasized that fog formation to some extent may be tolerated while still obtaining satisfactory separation, although it is normally preferable to operate the process with little or no fog for the reasons given above. To amplify further, despite the fact that the fog droplets tend to be swept along toward the condensing surface without regard to their composition, the portion of the primary vapor mixture remaining in uncondensed form may still undergo separation. Even in instances where extreme fog formation occurs, the process would be operative, since a small portion of primary vapor mixture would remain in equilibrium with the condensed fog droplets because of the vapor pressure of the liquid contained in the droplets. This small vapor portion would undergo separation according to the principles of the process.

Consequently, the temperature of the primary-secondary vapor mixture may be at or below its dew-point within the separating chamber, while efficient separation is obtained. However, the presence of fog does reduce the efficiency of separation by the amount described above. Since the dew-point of the primary-secondary vapor mixture varies constantly according to the concentration of the various components, it may be difficult to always operate in the complete absence of fog. Furthermore, it may be desirable from an economic standpoint, in the separation of some materials, to operate in the presence of some fog. Therefore, I prefer to operate the process in such a manner that the temperature of the primary-secondary vapor mixture exceeds about its dew-point within the separating chamber. This would allow for the presence of some fog, while still obtaining satisfactory separation.

It is of course understood that the components of the primary-secondary vapor mixture must not react with each other under the conditions existing during the operation of the process.

In my combination sweep diffusion-molecular filtration process I prefer to employ normally gaseous substances as the secondary vapor and normally liquid materials as the primary vapor mixture.

While I have set forth certain conditions with respect to the flow rates of the various vapors and temperature of the condensing surface as being observed during the experiments set forth above in relation to the separation of acetic acid and water, I do not intend to be limited thereto. It is obvious that these conditions will vary with each combination of primary vapor mixture and secondary vapor chosen.

While the particular descriptions of my various processes set forth above have been limited to binary mixtures in the primary vapor mixture, I wish it understood that this is by no means necessary. In instances in which my process is carried out using a primary vapor mixture containing more than two components, either the most or least diffusible component is concentrated first. Then, by recycling the remaining mixture, the next most or the next least diffusible would be concentrated, etc. Whether or not the most diffusible or least diffusible component is concentrated first would depend on whether an efficient enricher or an efficient stripper is used.

An enricher is either a differential diffusion column or a stagewise column in which the primary vapor mixture or feed is introduced at the bottom product end of the apparatus.

A stripper is either a differential diffusion column or a stagewise column in which the primary vapor mixture or feed is introduced at the top product end of the column.

In order to concentrate both components of a binary feed vapor mixture it is desirable to use a column having both enriching and stripping sections. This type of column is produced by introducing the feed vapor into a differential column or a stagewise column at a place intermediate to the top product and bottom product ends.

I wish it understood that the step of causing a portion of the primary vapor mixture to diffuse through the secondary vapor may be varied considerably. The vapors may be mixed in vapor form prior to their entry into the separating chamber; they may be separately introduced into the chamber and mixed therein, or the primary vapor mixture and the secondary vapor may be mixed in liquid form, vaporized and then introduced into the separating chamber.

Since any number of apparatus may be designed for carrying out my process, I do not intend to be limited to the particular details of structure of the embodiments set forth herein. Without intending to limit the modifications of the invention, I wish to point out that the refluxing step, being an operation distinct from the separation process, may be carried out in means integral with the column proper, separate from the column proper, or partially integral with and partially separate from the column itself.

Though I do not intend to be bound by any particular theory of operation, in my opinion the principles upon which my process operates are as follows:

The molecular filtration process depends for its action on a combination of the phenomena peculiar to gaseous diffusion and partial condensation.

Partial condensation, as its name implies, is the process wherein part of a mixture of vapors is condensed and the rest is withdrawn as vapor. In this process, the liquid is ordinarily richer with respect to the less volatile component of the mixture than the uncondensed vapor. If a noncondensable gas (i. e., one which does not condense in appreciable quantity under the conditions of the process) is introduced into the region where partial condensation is taking place, and if no appreciable turbulence exists, the vapors that condense would be forced to diffuse through the noncondensable gas in their travel to the condensing surface. If the gas concentration is high enough and the condensing surface temperature is low enough, the components of the vapor having the higher diffusion rates through the gas will arrive at the condensing surface in greater proportion, and they will condense at nearly the same composition as the vapor immediately adjacent to the condensing surface. Under these conditions, the relative diffusivities of the vapor components, rather than their relative volatilities, will control the liquid composition. The liquid phase will be enriched with respect to the vapor components having the higher rates of diffusion through the noncondensable gas, while the uncondensed portion of the vapor that is withdrawn will contain a higher concentration than the feed of those components having lower diffusion rates through the gas.

It should be recognized, that for partial condensation to proceed in the presence of a noncondensable gas, the temperature of the condensing surface must be maintained below the dew-point of the vapor-gas mixture immediately adjacent to it. This dew-point will usually be lower than the average dew-point of the entire vapor-gas mixture because of the higher gas concentration that is developed at the condensing surface as a result of the sweeping effect of the diffusing vapor.

The noncondensable gas, i. e., the secondary vapor, serves very much as a filtering membrane in this process. It sorts vapor molecules according to their rate of diffusion through the gas. This rate of diffusion, or diffusivity, depends on the size and velocity of both the vapor and gas molecules, and, because of their greater size and/or lower velocity, certain vapor molecules will have a lower rate of diffusion through the noncondensable gas than others. These vapor molecules are the ones that are partially "filtered out" by the noncondensable gas.

By means of the molecular filtration process, it is possible to reverse the direction of separation achieved by partial condensation. In a binary mixture, for example, if the more diffusible component of the vapor (i. e., the vapor component having the highest diffusivity with respect to the gas) is also the more volatile component, partial condensation would cause this component to concentrate in the uncondensed vapor, whereas, molecular filtration would concentrate it in the liquid. An example of this is shown in the experimental results presented hereinabove.

Turbulence in the gas-vapor mixture tends to make the composition of the mixture the same throughout, and, therefore, overcomes the selective process of diffusion. Because of this, separation by molecular filtration is favored by laminar, rather than turbulent, flow in the gas-vapor space.

While my molecular filtration process may be used to separate the individual components of various vapor mixtures which may be separated in other more conventional ways, such as distillation, it is particularly useful in the separation of mixtures which are separable either with difficulty or not at all by conventional methods, such as mixtures which form azeotropes, e. g., ethyl alcohol and water, and in the separation of mixtures which have very nearly equal boiling points, such as $H_2O^{18}$ from $H_2O^{16}$.

My combination sweep diffusion-molecular-filtration process would have utility where a rough separation of a mixture of gases and a mixture of vapors is desired.

One advantage of my molecular-filtration process is that it allows separation of azeotropic mixtures and mixtures of isotopes by the use of economical and easily designed equipment.

Another advantage of my process is that it produces a more quantitative, speedy, and economical separation of gas or vapor mixtures.

Still another advantage is that my process enables difficultly separable components to be separated with the use of a minimum quantity of filtering or screening vapor, since a separated portion is removed from the separating agent or secondary vapor within the separating chamber.

A further advantage of my process is that the filtering medium may be chosen from a wide scope of cheap and easily obtainable materials in contrast to processes which employ a permeable membrane having a highly critical pore size.

An advantage of my combination sweep diffusion-molecular-filtration process is that the combining of the separations within a single apparatus results in a saving of equipment, time and energy.

Having thus described my invention, I claim:

1. The process of concentrating a component of a primary vapor mixture which comprises introducing into a substantially unobstructed separating zone said primary vapor mixture and a secondary vapor which has a dew-point such that it will not be condensed in appreciable amounts in the presence of the mixture of primary and secondary vapors thus formed, forming separate portions of the primary vapor mixture richer respectively in a more diffusible and a less diffusible component of said vapor mixture, condensing at least a part of said portion richer in a more diffusible component adjacent to its place of formation and within the separating zone, removing the condensed portion enriched in a more diffusible component, and removing in vapor form the portion richer in a less diffusible component from its place of formation, said secondary vapor being sufficiently insoluble in the condensed portion that its rate of removal in vapor form exceeds its rate of removal in the condensate.

2. The process of concentrating a component of a primary vapor mixture whose components are normally liquid substances which comprises introducing into a substantially unobstructed separating zone said primary vapor mixture and a secondary vapor which has a dew-point such that it will not be condensed in appreciable amounts in the presence of the mixture of primary and secondary vapors thus formed, forming separate portions of the primary vapor mixture richer respectively in a more diffusible and a less diffusible component of said vapor mixture, condensing at least a part of said portion richer in a more diffusible component adjacent its place of formation and within the separating zone, removing the condensed portion enriched in a more diffusible component, and removing in vapor form the portion richer in a less diffusible component from its place of formation, said secondary vapor being sufficiently insoluble in the condensed portion that its rate of removal in vapor form exceeds its rate of removal in the condensate.

3. The process of concentrating a component of a primary vapor mixture which comprises introducing into a substantially unobstructed separating zone said primary vapor mixture and a secondary vapor which is a normally gaseous substance and which has a dew-point such that it will not be condensed in appreciable amounts in the presence of the mixture of primary and secondary vapors thus formed, forming separate portions of the primary vapor mixture richer respectively in a more diffusible and a less diffusible component of said vapor mixture, condensing at least a part of said portion richer in a more diffusible component adjacent its place of formation and within the separating zone, removing the condensed portion enriched in a more diffusible component, and removing in vapor form the portion richer in a less diffusible component from its place of formation, said secondary vapor being sufficiently insoluble in the condensed portion that its rate of removal in vapor form exceeds its rate of removal in the condensate.

4. The process of concentrating a component of a primary vapor mixture whose components are normally liquid substances which comprises introducing into a substantially unobstructed separating zone said primary vapor and a secondary vapor which is a normally gaseous substance, forming separate portions of the primary vapor mixture richer respectively in a more diffusible and a less diffusible component of said vapor mixture, condensing at least a part of said portion richer in a more diffusible component adjacent its place of formation and within the separating zone, removing the condensed portion enriched in a more diffusible component, and removing in vapor form the portion richer in a less diffusible component from its place of formation, said secondary vapor being sufficiently insoluble in the condensed portion that its rate of removal in vapor form exceeds its rate of removal in the condensate.

5. The process of concentrating a component of a primary vapor mixture which comprises establishing a flowing stream of a secondary vapor within a substantially unobstructed separating zone, said secondary vapor having a dew-point such that it will not condense in appreciable amounts in the presence of a mixture of primary and secondary vapors, introducing the primary vapor mixture into the separating zone, forming separate portions of the primary vapor mixture richer respectively in a more diffusible and a less diffusible component of said vapor mixture, the primary-secondary vapor mixture being at a temperature above about its dew-point, condensing at least a part of said portion richer in a more diffusible component adjacent its place of formation and within the separating zone, removing the condensed portion enriched in a more diffusible component, and removing in vapor form the portion richer in a less diffusible component from its place of formation, said secondary vapor being sufficiently insoluble in the condensed portion that its rate of removal in vapor form exceeds its rate of removal in the condensate.

6. The process of concentrating a component of a primary vapor mixture which comprises establishing a flowing stream of a secondary vapor within a substantially unobstructed separating zone, which secondary vapor is a normally gaseous substance and which has a dew-point such that it will not be condensed in appreciable amounts in the presence of a mixture of primary and secondary vapors, introducing the primary vapor mixture into the separating zone, forming separate portions of the primary vapor mixture richer respectively in a more diffusible and a less diffusible component of said vapor mixture, the primary-secondary vapor mixture being at a temperature above about its dew-point, condensing at least a part of said portion richer in a more diffusible component adjacent its place of formation and within the separating zone, removing the condensed portion enriched in a more diffusible component and removing in vapor form the portion richer in a less diffusible component from its place of formation, said secondary vapor being sufficiently insoluble in the condensed portion that its rate of removal in vapor form exceeds its rate of removal in the condensate.

7. The process of concentrating a component of a primary vapor mixture whose components are normally liquid substances which comprises establishing a flowing stream of a secondary vapor within a substantially unobstructed separating zone, which secondary vapor has a dew-point such that it will not be condensed in appreciable amounts in the presence of a mixture of primary and secondary vapors, introducing the primary vapor mixture into the separating zone, forming separate portions of the primary vapor mixture richer respectively in a more diffusible and a less diffusible component of said vapor mixture, the primary-secondary vapor mixture being at a temperature above about its dew-point, condensing at least a part of said portion richer in a more diffusible component adjacent its place of formation and within the separating zone, removing the condensed portion enriched in a more diffusible component, and removing in vapor form the portion richer in a less diffusible component from its place of formation, said secondary vapor being sufficiently insoluble in the condensed portion that its rate of removal in vapor form exceeds its rate of removal in the condensate.

8. The process of concentrating a component of a primary vapor mixture whose components are normally liquid materials which comprises establishing a flowing stream of a secondary vapor within a substantially unobstructed separating zone, which secondary vapor is a normally gaseous substance, introducing the primary vapor mixture into the separating zone, forming separate portions of the primary vapor mixture richer respectively in a more diffusible and a less diffusible component of said vapor mixture, the primary-secondary vapor mixture being at a temperature above about its dew-point, condensing at least a part of said portion richer in a more diffusible component adjacent its place of formation and within the separating zone, removing the condensed portion enriched in a more diffusible component, and removing in vapor form the portion richer in a less diffusible component from its place of formation, said secondary vapor being sufficiently insoluble in the condensed portion that its rate of removal in vapor form exceeds its rate of removal in the condensate.

9. The process of concentrating a component of an azeotropic vapor mixture which comprises establishing a flowing stream of a filtering vapor within a substantially unobstructed separating zone, which filtering vapor has a dew-point such that it will not be condensed in appreciable amounts in the presence of a mixture of azeotropic vapor and filtering vapors, introducing the azeotropic vapor mixture into the separating zone, forming separate portions of the azeotropic vapor mixture richer respectively in a more diffusible and a less diffusible component of said vapor mixture, the azeotropic vapor-filtering vapor mixture being at a temperature above about its dew-point, condensing at least a part of said portion richer in a more diffusible component adjacent its place of formation and within the separating zone, removing the condensed portion enriched in a more diffusible component, and removing in vapor form the portion richer in a less diffusible component from its place of formation, said filtering vapor being sufficiently insoluble in the condensed portion that its rate of removal in vapor form exceeds its rate of removal in the condensate.

10. The process of concentrating a component of a mixture of isotopes which comprises establishing a flowing stream of a filtering vapor within a substantially unobstructed separating zone, which filtering vapor has a dew-point such that it will not be condensed in appreciable amounts in the presence of a mixture of isotope vapors and filtering vapor, introducing the isotope mixture in vapor form into the separating zone, forming separate portions of the isotope vapor mixture richer respectively in a more diffusible and a less diffusible component of said vapor mixture, said isotope vapor-filtering vapor mixture being at a temperature above about its dew-point, condensing at least a part of said portion richer in a more diffusible component adjacent its place of formation and within the separating zone, removing the condensed portion enriched in a more diffusible component, and removing in vapor form the portion richer in a less diffusible component from its place of formation, said filtering vapor being sufficiently insoluble in the condensed portion that its rate of removal in vapor form exceeds its rate of removal in the condensate.

11. The process of concentrating a component of a primary vapor mixture which comprises introducing said primary vapor mixture into a flowing stream of a secondary vapor which has a dew-point such that it will not be condensed in appreciable amounts in the presence of the mixture of primary and secondary vapors thus formed, the primary-secondary vapor mixture so formed being at a temperature greater than about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing at least a part of the portion of the primary vapor richer in a more diffusible component adjacent its place of formation, evaporating at least a portion of said condensate, reintroducing this evaporated condensate into the flowing stream of the secondary vapor at a place nearer the origin of the flowing stream of secondary vapor than that place at which it was condensed, recondensing at least a part of a more diffusible portion thereof at a place nearer the origin of the flowing stream of secondary vapor than the original place of condensation, removing this condensate enriched in a more diffusible component, and removing in vapor form the portion of vapor richer in a less diffusible component, said secondary vapor being sufficiently insoluble in the condensed portion that its rate of removal in vapor form exceeds its rate of removal in the condensate.

12. The process of concentrating a component of a primary vapor mixture which comprises introducing said primary vapor mixture into a flowing stream of a secondary vapor which has a dew-point such that it will not be condensed in appreciable amounts in the presence of the mixture of primary and secondary vapors thus formed, the primary-secondary vapor mixture so formed being at a temperature greater than about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing at least a part of the portion of the primary vapor richer in a more diffusible component adjacent its place of formation, circulating by means of gravity at least a portion of the condensate thus formed to an evaporating zone, evaporating at least a portion of said condensate, reintroducing this evaporated condensate into the flowing stream of the secondary vapor at a place nearer the origin of the flowing stream of secondary vapor than that place at which it was condensed, recondensing at least a part of a more diffusible portion thereof at a place nearer the origin of the flowing stream of secondary vapor than the original place of condensation, removing this condensate enriched in a more diffusible component, and removing in vapor form the portion of vapor richer in a less diffusible component, said secondary vapor being sufficiently insoluble in the condensed portion that its rate of removal in vapor form exceeds its rate of removal in the condensate.

13. The process of concentrating a component of a primary vapor mixture whose components are normally liquid substances which comprises introducing said primary vapor mixture into a flowing stream of a secondary vapor which has a dew-point such that it will not be condensed in appreciable amounts in the presence of the mixture of primary and secondary vapor thus formed, the primary-secondary vapor mixture so formed being at a temperature greater than about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing at least a part of the portion of the primary vapor richer in a more diffusible component adjacent its place of formation, evaporating at least a portion of said condensate, reintroducing this evaporated condensate into the flowing stream of the secondary vapor at a place nearer the origin of the flowing stream of secondary vapor than that place at which it was condensed, recondensing at least a part of a more diffusible portion thereof at a place nearer the origin of the flowing stream of secondary vapor than the original place of condensation, removing this condensate enriched in a more diffusible component, and removing in vapor form the portion of vapor richer in a less diffusible component, said secondary vapor being sufficiently insoluble in the condensed portion that its rate of removal in vapor form exceeds its rate of removal in the condensate.

14. The process of concentrating a component of a primary vapor mixture which comprises introducing said primary vapor mixture into a flowing stream of a secondary vapor which is a normally gaseous substance and which has a dew-point such that it will not be condensed in appreciable amounts in the presence of the mixture of primary and secondary vapors thus formed, the primary-secondary vapor mixture so formed being at a temperature greater than about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing at least a part of the portion of the primary vapor richer in a more diffusible component adjacent its place of formation, evaporating at least a portion of said condensate, reintroducing this evaporated condensate into the flowing stream of the secondary vapor at a place nearer the origin of the flowing stream of secondary vapor than that place at which it was condensed, recondensing at least a part of a more diffusible portion thereof at a place nearer the origin of the flowing stream of secondary vapor than the original place of condensation, removing this condensate enriched in a more diffusible component, and removing in vapor form the portion of vapor richer in a less diffusible component, said secondary vapor being sufficiently insoluble in the condensed portion that its rate of removal in vapor form exceeds its rate of removal in the condensate.

15. The process of concentrating a component of a primary vapor mixture whose components are normally liquid substances which comprises introducing said primary vapor mixture into a flowing stream of a secondary vapor which is a normally gaseous substance, the primary-secondary vapor mixture so formed being at a temperature greater than about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing at least a part of the portion of the primary vapor mixture richer in a more diffusible component adjacent its place of formation, evaporating at least a portion of said condensate, reintroducing this evaporated condensate into the flowing stream of the seondary vapor at a place nearer the origin of the flowing stream of secondary vapor than that place at which it was condensed, recondensing a more diffusible portion thereof at a place nearer the origin of the flowing stream of secondary vapor than the original place of condensation, removing this condensate enriched in a more diffusible component, and removing in vapor form the portion of vapor richer in a less diffusible component, said secondary vapor being sufficiently insoluble in the condensed portion that its rate of removal in vapor form exceeds its rate of removal in the condensate.

16. The process of concentrating a component of a primary vapor mixture which comprises establishing a flow of a secondary vapor through a plurality of condensing chambers from a first to a last chamber, each of said chambers being provided with an evaporating chamber, said secondary vapor having a dew-point such that it will not be condensed in appreciable amounts in the presence of the mixture of primary and secondary vapors, introducing the primary vapor mixture into one of the condensing chambers, the resultant primary-secondary vapor mixture being at a temperature above about its dew-point, causing at least a portion of the primary vapor mixture in each of the condensing chambers to diffuse in a substantially unobstructed path through the secondary vapor, whereby separate portions of the primary vapor mixture enriched respectively in a more diffusible and a less diffusible component of said vapor mixture are formed, condensing at least a part of the portion enriched with respect to a more diffusible component in each of the condensing chambers, said secondary vapor being sufficiently insoluble in the condensed portion that its rate of removal in vapor form from each condensing chamber exceeds its rate of removal in the condensate, circulating at least a portion of the condensate from each condensing chamber except the first to the next previous evaporating chamber, evaporating at least a portion of this condensate, circulating the vaporized condensate from each evaporating chamber to the next previous condensing chamber, withdrawing liquid condensate from the first condensing chamber and withdrawing vapors from the last condensing chamber.

17. The process of concentrating a component of a primary vapor mixture which comprises establishing a flow of a secondary vapor through a plurality of condensing chambers from a first to a last chamber, each of said condensing chambers being provided with an evaporating chamber, said secondary vapor having a dew-point such that it will not be condensed in appreciable amounts in the presence of the mixture of primary and secondary vapors, introducing the primary vapor mixture into one of the condensing chambers, the resultant primary-secondary vapor mixture being at a temperature above about its dew-point, causing at least a portion of the primary vapor mixture in each of the condensing chambers to diffuse in a substantially unobstructed path through the secondary vapor, whereby separate portions of the primary vapor mixture enriched respectively in a more diffusible and a less diffusible component of the vapor mixture are formed, condensing at least a part of the portion enriched with respect to a more diffusible component in each of the condensing chambers, said secondary vapor being sufficiently insoluble in the condensed portion that its rate of removal in vapor form from each condensing chamber exceeds its rate of removal in the condensate, circulating at least a portion of the condensate from each condensing chamber except the first to the next previous evaporating chamber, evaporating at least a portion of this condensate, circulating the vaporized condensate from each evaporating chamber to the next previous condensing chamber, withdrawing liquid condensate from the first condensing chamber, withdrawing vapors from the last condensing chamber, removing the remaining portion of primary vapor from this vaporous withdrawal product and recycling the regenerated secondary vapor to the first condensing chamber.

18. The process of concentrating a component of a primary vapor mixture which comprises establishing a flow of a secondary vapor through a plurality of condensing chambers from a first to a last chamber, each of said condensing chambers being provided with an evaporating chamber, said secondary vapor having a dew-point such that it will not be condensed in appreciable amounts in the presence of the mixture of primary and secondary vapors, introducing the primary vapor mixture into one of the intermediate condensing chambers, the resultant primary-secondary vapor mixture being at a temperature above about its dew-point, causing at least a portion of the primary vapor mixture in each of the condensing chambers to diffuse in a substantially unobstructed path through the secondary vapor, whereby separate portions of the primary vapor mixture enriched respectively in a more diffusible and a less diffusible component of said vapor mixture are formed, condensing at least a part of the portion enriched with respect to a more diffusible component in each of the condensing chambers, said secondary vapor being sufficiently insoluble in the condensed portion that its rate of removal in vapor form from each condensing chamber exceeds its rate of removal in the condensate, circulating at least a portion of this condensate from each condensing chamber except the first to the next previous evaporating chamber, evaporating at least a portion of the condensate, circulating the vaporized condensate from each evaporating chamber to the next previous condensing chamber, withdrawing liquid condensate from the first condensing chamber, withdrawing from the last condensing chamber the portion of vapor richer in a less diffusible component, removing the remaining portion of primary vapor from this vaporous withdrawal product, recycling the regenerated secondary vapor to the first condensing chamber, refluxing at least a portion of the recovered primary vapor mixture in vapor form to at least one of the terminal condensing chambers.

19. The process of concentrating a component of a primary vapor mixture whose components are normally liquid substances which comprises establishing a flow of a secondary vapor through a plurality of condensing chambers from a first to a last chamber, each of said condensing chambers being provided with an evaporating chamber, said secondary vapor having a dew-point such that it will not be condensed in appreciable amounts in the presence of the mixture of primary and secondary vapors, introducing the primary vapor mixture into one of the condensing chambers, the resultant primary-secondary vapor mixture being at a temperature above about its dew-point, causing at least a portion of the primary vapor mixture in each of the chambers to diffuse in a substantially unobstructed path through the secondary vapor, whereby separate portions of the primary vapor mixture enriched respectively in a more diffusible and a less diffusible component of said vapor mixture are formed, condensing at least a part of the portion enriched with respect to a more diffusible component in each of the condensing chambers, said secondary vapor being sufficiently insoluble in the condensed portion that its rate of removal in vapor form from each condensing chamber exceeds its rate of removal in the condensate, circulating at least a portion of condensate from each condensing chamber except the first to the next previous evaporating chamber, evaporating at least a portion of this condensate, circulating the vaporized condensate from each evaporating chamber to the next previous condensing chamber, withdrawing liquid condensate from the first condensing chamber and withdrawing vapors from the last condensing chamber.

20. The process of concentrating a component of a primary vapor mixture which comprises establishing a flow of secondary vapor which is a normally gaseous substance through a plurality of condensing chambers from a first to a last chamber, each of said condensing chambers being provided with an evaporating chamber, said secondary vapor having a dew-point such that it will not be condensed in appreciable amounts in the presence of the mixture of primary and secondary vapors, introducing the primary vapor mixture into one of the condensing chambers, the resultant primary-secondary vapor mixture being at a temperature above about its dew-point, causing at least a portion of the primary vapor mixture in each of the chambers to diffuse in a substantially unobstructed path through the secondary vapor, whereby separate portions of the primary vapor mixture enriched respectively in a more diffusible and a less diffusible component of said vapor mixture are formed, condensing at least a part of the portion enriched with respect to a more diffusible component in each of the condensing chambers, said secondary vapor being sufficiently insoluble in the condensed portion that its rate of removal in vapor form from each condensing chamber exceeds its rate of removal in the condensate, circulating at least a portion of the condensate from each condensing chamber to the next previous evaporating chamber, evaporating at least a portion of this condensate, circulating the vaporized condensate from each evaporating chamber to the next previous condensing chamber, withdrawing liquid condensate from the first condensing chamber and withdrawing vapors from the last condensing chamber.

21. The process of concentrating a component of a primary vapor mixture whose components are normally liquid substances which comprises establishing a flow of secondary vapor which is a normally gaseous substance through a plurality of condensing chambers from a first to a last chamber, each of said condensing chambers being provided with an evoparting chamber, introducing the primary vapor mixture into one of the condensing chambers, the resultant primary-secondary vapor mixture being at a temperature above about its dew-point, causing at least a portion of the primary vapor mixture in each of the chambers to diffuse in a substantially unobstructed path through the secondary vapor, whereby separate portions of the primary vapor mixture enriched respectively in a more diffusible and a less diffusible component of said vapor mixture are formed, condensing at least a part of the portion enriched with respect to a more diffusible component in each of the condensing chambers, said secondary vapor being sufficiently insoluble in the condensed portion that its rate of removal in vapor form from each condensing chamber exceeds its rate of removal in the condensate, circulating at least a portion of the condensate from each condensing chamber except the first to the next previous evaporating chamber, evaporating at least a portion of this condensate, circulating the vaporized condensate from each evaporating chamber to the next previous condensing chamber, withdrawing liquid condensate from the first condensing chamber and withdrawing vapors from the last condensing chamber.

22. The process of concentrating a component of a primary vapor mixture which comprises establishing a flow of secondary vapor between and approximately parallel to an evaporating surface and a condensing surface, said secondary vapor having a dew-point such that it will not be condensed in appreciable amounts in the presence of the mixture of primary and secondary vapor, introducing a primary vapor mixture into said flow of secondary vapor, the resultant primary-secondary vapor mixture being at a temperature above about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing on said condensing surface at least a part of the portion of said primary vapor mixture richer in a more diffusible component, said secondary vapor being sufficiently insoluble in the condensed portion that its rate of flow along the condensing surface in vapor form exceeds its rate of removal in the condensate, circulating at least a portion of the condensate thus formed from said condensing surface to said evaporating surface, evaporating at least a portion of said condensate, reintroducing this evaporated condensate into the flow of secondary vapor at a place nearer the origin of the flowing stream of secondary vapor than the place at which it was condensed, recondensing at least a part of a more diffusible portion thereof on said condensing surface at a place nearer the origin of the flowing stream of secondary vapor than the original place of condensation, removing condensate enriched in a more diffusible component from said condensing surface and removing in vapor form from between said surfaces the portion of primary vapor mixture richer in a less diffusible component.

23. The process of concentrating a component of a primary vapor mixture which comprises establishing a flow of secondary vapor between and approximately parallel to an evaporating surface and a condensing surface which is substantially co-extensive therewith, said secondary vapor having a dew-point such that it will not be condensed in appreciable amounts in the presence of the mixture of primary and secondary vapors, introducing a primary vapor mixture into said flow of secondary vapor, the resultant primary-secondary vapor mixture being at a temperature above about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing on said condensing surface at least a part of the portion of said primary vapor mixture richer in a more diffusible component, said secondary vapor being sufficiently insoluble in the condensed portion that its rate of flow along the condensing surface in vapor form exceeds its rate of removal in the condensate, circulating at least a portion of the condensate thus formed from said condensing surface to said evaporating surface, evaporating at least a portion of said condensate, reintroducing this evaporated condensate into the flow of secondary vapor at a place nearer the origin of the flowing stream of secondary vapor than the place at which it was condensed, recondensing at least a part of a more diffusible portion thereof on said condensing surface at a place nearer the origin of the flowing stream of secondary vapor than the original place of condensation, removing condensate enriched in a more diffusible component from said condensing surface and removing in vapor form from between said surfaces the portion of primary vapor mixture richer in a less diffusible component.

24. The process of concentrating a component of a primary vapor mixture which comprises establishing a flow of secondary vapor between and approximately parallel to an evaporating surface and a condensing surface, said secondary vapor having a dew-point such that it will not be condensed in appreciable amounts in the presence of the mixture of primary and secondary vapors, introducing a primary vapor mixture into said flow of secondary vapor, the resultant primary-secondary vapor mixture being at a temperature above about its dew-point, whereby at least a portion of the primary vapor diffuses in a substantially unobstructed path through the secondary vapor, forming separate portions of the primary vapor mixture richer respectively in a more diffusible and a less diffusible component of said vapor mixture, condensing on said condensing surface at least a part of the portion of said primary vapor mixture richer in a more diffusible component, said secondary vapor being sufficiently insoluble in the condensed portion that its rate of flow along the condensing surface in vapor form exceeds its rate of removal in the condensate, circulating by gravity at least a portion of the condensate thus formed from said condensing surface to said evaporating surface, evaporating at least a portion of said condensate, reintroducing this evaporated condensate into the flow of secondary vapor at a place nearer the origin of the flowing stream of secondary vapor than the place at which it was condensed, recondensing at least a part of a more diffusible portion thereof on said condensing surface at a place nearer the origin of the flowing stream of secondary vapor than the original place of condensation, removing condensate enriched in a more diffusible component from said condensing surface, and removing in vapor form from between said surfaces the portion of primary vapor mixture richer in a less diffusible component.

25. The process of concentrating a component of a primary vapor mixture which comprises establishing a flow of secondary vapor between and approximately parallel to a condensing and an evaporating surface, said secondary vapor having a dew-point such that it will not be condensed in appreciable amounts in the presence of the mixture of primary and secondary vapors, introducing at a place intermediate of the places of introduction and removal of the secondary vapor between said surfaces a primary vapor mixture into said flow of secondary vapor, the resultant primary-secondary vapor mixture being at a temperature above about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing on said condensing surface at least a part of the portion of said primary vapor mixture richer in a more diffusible component, said secondary vapor being sufficiently insoluble in the condensed portion that its rate of flow along the condensing surface in vapor form exceeds its rate of removal in the condensate, circulating at least a portion of the condensate thus formed from said condensing surface to said evaporating surface, evaporating at least a portion of said condensate, reintroducing this evaporated condensate into the flow of secondary vapor at a place nearer the origin of the flowing stream of secondary vapor than the place at which it was condensed, recondensing at least a part of a more diffusible portion thereof on said condensing surface at a place nearer the origin of the flowing stream of secondary vapor than the original place of condensation, removing condensate enriched in a more diffusible component in vapor form from between said surfaces the portion of primary vapor mixture richer in a less diffusible component.

26. The process of concentrating a component of a primary vapor mixture whose components are normally liquid substances which comprises establishing a flow of secondary vapor between and approximately parallel to an evaporating surface and a condensing surface, said secondary vapor having a dew-point such that it will not be condensed in appreciable amounts in the presence of the mixture of primary and secondary vapors, introducing a primary vapor mixture into said flow of secondary vapor, the resultant primary-secondary vapor mixture being at a temperature above about its dew-point, whereby at least a portion of the primary vapor mixture diffuses in a substantially unobstructed path through the secondary vapor, forming separate portions of the primary vapor mixture richer respectively in a more diffusible and a less diffusible component of said vapor mixture, condensing on said condensing surface at least a part of the portion of said primary vapor mixture richer in a more diffusible component, said secondary vapor being sufficiently insoluble in the condensed portion that its rate of flow along the condensing surface in vapor form exceeds its rate of removal in the condensate, circulating at least a portion of the condensate thus formed from said condensing surface to said evaporating surface, evaporating at least a portion of said condensate, reintroducing this evaporated condensate into the flow of secondary vapor at a place nearer the origin of the flowing stream of secondary vapor than the place at which it was condensed, recondensing at least a part of a more diffusible portion thereof on said condensing surface at a place nearer the origin of the flowing stream of secondary vapor than the original place of condensation, removing condensate enriched in a more diffusible component from said condensing surface, and removing in vapor form from between said surfaces the portion of primary vapor mixture richer in less diffusible component.

27. The process of concentrating a component of a primary vapor mixture which comprises establishing a flow of secondary vapor between and approximately parallel to a condensing and an evaporating surface, said secondary vapor being a normally gaseous substance and having a dew-point such that it will not be condensed in appreciable amounts in the presence of the mixture of primary and secondary vapors, introducing a primary vapor mixture into said flow of secondary vapor, the resultant primary-secondary vapor mixture being at a temperature above about its dew-point, whereby at least a portion of the primary vapor diffuses in a substantially unobstructed path through the secondary vapor, forming separate portions of the primary vapor mixture richer respectively in a more diffusible and a less diffusible component of said vapor mixture, condensing on said condensing surface at least a part of the portion of said primary vapor mixture richer in a more diffusible component, said secondary vapor being sufficiently insoluble in the condensed portion that its rate of flow along the condensing surface in vapor form exceeds its rate of removal in the condensate, circulating at least a portion of the condensate thus formed from said condensing surface to said evaporating surface, evaporating at least a portion of said condensate, reintroducing this evaporated condensate into the flow of secondary vapor at a place nearer the origin of the flowing stream of secondary vapor than the place at which it was condensed, and recondensing at least a part of a more diffusible portion thereof on said condensing surface at a place nearer the origin of the flowing stream of secondary vapor than the original place of condensation, removing condensate enriched in a more diffusible component from said condensing surface, and removing in vapor form from between said surfaces the portion of primary vapor mixture richer in a less diffusible component.

28. The process of concentrating a component of a primary vapor mixture whose components are normally liquid materials which comprises establishing a flow of secondary vapor between and approximately parallel to an evaporating and a condensing surface, said secondary vapor being a normally gaseous substance, introducing a primary vapor mixture into said flow of secondary vapor, the resultant primary-secondary vapor mixture being at a temperature above about its dew-point, whereby at least a portion of the primary vapor diffuses in a substantially unobstructed path through the secondary vapor, forming separate portions of the primary vapor mixture richer respectively in a more diffusible and a less diffusible component of said vapor mixture, condensing on said condensing surface the portion of said primary vapor mixture richer in a more diffusible component, said secondary vapor being sufficiently insoluble in the condensed portion that its rate of flow along the condensing surface in vapor form exceeds its rate of removal in the condensate, circulating at least a portion of the condensate thus formed from said condensing surface to said evaporating surface, evaporating at least a portion of said condensate, reintroducing this evaporated condensate into the flow of secondary vapor at a place nearer the origin of the flowing stream of secondary vapor than the place at which it was condensed, recondensing at least a part of a more diffusible portion thereof on said condensing surface at a place nearer the origin of the flowing stream of secondary vapor than the original place of condensation, removing this condensate enriched in a more diffusible component from said condensing surface, and removing in vapor form from between said surfaces the portion of primary vapor mixture richer in a less diffusible component.

29. A process of separating the various components of a mixture of vapors of normally liquid substances and a mixture of normally gaseous substances by simultaneous sweep diffusion and molecular filtration comprising introducing the mixture of vapors into the mixture of gases, whereby at least a portion of the vapor mixture diffuses in a substantially unobstructed path through the gaseous mixture, whereby at least a portion of the gaseous mixture is simultaneously swept along with a portion of the vapor mixture, forming separate portions of the vapor mixture enriched respectively in a more diffusible and a less diffusible component of the vapor mixture and forming separate portions of the gaseous mixture enriched respectively in a less diffusible and a more diffusible component of the gaseous mixture, said gas-vapor mixture being at a temperature above about its dew-point, condensing the portion richer in a more diffusible vapor component adjacent its place of formation, withdrawing said condensate, withdrawing in gaseous form a less diffusible portion of the gas mixture, which has been swept along with the vapor portion enriched in a more diffusible component, from a point near the place of condensation, and withdrawing in vapor form at a point further removed from the place of condensation the portion richer in a less diffusible vapor component and a more diffusible gas component, said gaseous substances being sufficiently insoluble in said condensed portion that their rates of withdrawal in vapor form exceed their rates of withdrawal in the condensate.

30. Apparatus for concentrating a component of a primary vapor mixture by differential diffusion through a secondary vapor comprising a series of stages, each of which stages comprises a condensing chamber and an evaporating chamber, said series beginning with a condensing chamber, having alternate condensing and evaporating chambers and ending with an evaporating chamber, each of said condensing chambers being longer with respect to the direction of vapor flow than it is deep, each of said condensing chambers having a vapor inlet and a vapor outlet, said outlet and inlet being positioned at opposite ends of each chamber with respect to the path of vapor flow, conduit means connecting the vapor outlet of each condensing chamber to the vapor inlet of the next condensing chamber in the series, a passageway located near the vapor inlet for conducting liquid condensate from each condensing chamber except the first to the corresponding end of the next previous evaporating chamber, trap means associated with said passageway for preventing vapor backflow, a vapor passageway located at the other end of each evaporating chamber for introducing evaporated condensate into the next previous condensing chamber at a point near the vapor inlet of that condensing chamber, means for establishing a flow of secondary vapor through the interconnected condensing chambers, means for introducing the primary vapor mixture into one of said stages, means for withdrawing liquid condensate from the first of said condensing chambers, and means for withdrawing vapor from the last of said condensing chambers.

31. Apparatus for concentrating a component of a primary vapor mixture by differential diffusion through a secondary vapor comprising a series of stages, each of which stages comprises a condensing chamber and an evaporating chamber, said series beginning with a condensing chamber, having alternate condensing and evaporating chambers and ending with an evaporating chamber, each of said condensing chambers being longer with respect to the direction of vapor flow than it is deep, each of said condensing chambers having a vapor inlet and a vapor outlet, said outlet and inlet being positioned at opposite ends of each chamber with respect to the path of vapor flow, conduit means connecting the vapor outlet of each condensing chamber to the vapor inlet of the next condensing chamber in the series, a passageway located near the vapor inlet for conducting liquid condensate from each condensing chamber except the first to the corresponding end of the next previous evaporating chamber, trap means associated with said passageway for preventing vapor backflow, a vapor passageway located at the other end of each evaporating chamber for introducing evaporated condensate into the next previous condensing chamber at a point near the vapor inlet of that condensing chamber, means for establishing a flow of secondary vapor through the interconnected condensing chambers, means for introducing the primary vapor mixture into one of said stages, means for withdrawing liquid condensate from the first of said condensing chambers, means for withdrawing vapor from the last of said condensing chambers, means for removing the remaining constituents of the vapor mixture to be separated which are contained in this vapor withdrawal product, and means for recycling the remaining vapor to the first of said condensing chambers.

32. Apparatus for concentrating a component of a primary vapor mixture by differential diffusion through a secondary vapor comprising a series of stages, each of which stages comprises a condensing chamber and an evaporating chamber, said series beginning with a condensing chamber, having alternate condensing and evaporating chambers and ending with an evaporating chamber, each of said condensing chambers being longer with respect to the direction of vapor flow than it is deep, each of said condensing chambers having a vapor inlet and a vapor outlet, said outlet and inlet being positioned at opposite ends of each chamber with respect to the path of vapor flow, conduit means connecting the vapor outlet of each condensing chamber to the vapor inlet of the next condensing chamber in the series, a passageway located near the vapor inlet for conducting liquid condensate from each condensing chamber except the first to the corresponding end of the next previous evaporating chamber, trap means associated with said passageway for preventing vapor backflow, a vapor passageway located at the other end of each evaporating chamber for introducing evaporated condensate into the next previous condensing chamber at a point near the vapor inlet of that condensing chamber, means for establishing a flow of secondary vapor through the interconnected condensing chambers, means for introducing the primary vapor mixture into one of said stages, means for withdrawing liquid condensate from the first of said condensing chambers, means for withdrawing vapor from the last of said condensing chambers, means for removing the remaining constituents of the vapor mixture to be separated which are contained in this vapor withdrawal product, means for recycling the remaining vapor to the first of said condensing chamber, and means for refluxing at least a portion of the recovered primary vapor mixture into at least one of the terminal stages.

33. Apparatus for carrying out a stagewise column process for concentrating a component of a primary vapor mixture comprising a series of stages mounted one above the other and housed in a common chamber, each of which stages comprises a lower condensing chamber and an upper evaporating chamber, said series beginning with a condensing chamber, having alternate condensing and evaporating chambers, and ending with an evaporating chamber, each of said condensing chambers being longer with respect to the direction of vapor flow than it is deep, each of said condensing chambers having a vapor inlet and a vapor outlet, said outlet and inlet being positioned at opposite ends of each condensing chamber with respect to the direction of vapor flow, conduit means connecting the vapor outlet of each condensing chamber with the vapor inlet of the next above condensing chamber, a passageway located near the vapor inlet for conducting liquid condensate from each condensing chamber except the lowest to the corresponding end of the next previous evaporating chamber, trap means associated with said passageway for preventing vapor backflow, a vapor passageway located at the other end of each evaporating chamber for introducing evaporating condensate into the next lower condensing chamber at a point near the vapor inlet of that condensing chamber, means for establishing a flow of secondary vapor through the interconnected condensing chambers, means for introducing the primary vapor mixture into one of said stages, means for withdrawing liquid condensate from the lowest of said condensing chambers, and means for withdrawing vapor from the topmost of said condensing chambers.

34. A differential column for concentrating a component of a primary vapor mixture by different diffusion through a secondary vapor comprising an outer cylinder, an inner cylinder substantially concentric with said outer cylinder, the co-extensive length of the two cylinders being greater than the difference between their radii, means for heating the outer cylinder, means for cooling the inner cylinder, a dividing member shaped to retain liquid on its upper surface, said dividing member being positioned between said inner and outer cylinders in such a manner that the liquid retained by the dividing member will be beneath said inner cylinder, a baffle plate substantially co-extensive with at least one of said inner and outer cylinders, said plate being positioned within the outer cylinder and to one side of the inner cylinder, said plate extending to a point between the inner cylinder and the dividing member and below the surface of liquid formed during operation on the upper surface of the dividing member, means for establishing a longitudinal flow of secondary vapor and primary vapor mixture in the upper segment between the outer and inner cylinders, means for withdrawing the liquid condensate from approximately that end of the column away from which the secondary and primary vapor flow, and means for withdrawing uncondensed vapor from approximately the other end of the column.

35. A differential column for concentrating a component of a primary vapor mixture by differential diffusion through a secondary vapor comprising an outer cylinder, an inner cylinder substantially concentric with said outer cylinder, the co-extensive length of the two cylinders being greater than the difference between their radii, means for heating the outer cylinder, means for cooling the inner cylinder, a dividing member shaped to retain liquid on its upper surface, said dividing member being positioned between said inner and outer cylinders in such a manner that the liquid retained by the dividing member will be beneath said inner cylinder, a baffle plate substantially co-extensive with at least one of said inner and outer cylinders, said plate being positioned within the outer cylinder and to one side of the inner cylinder, said plate extending to a point between the inner cylinder and the dividing member and below the surface of liquid formed during operation on the upper surface of the dividing member, means for establishing a longitudinal flow of secondary vapor and primary vapor mixture in the upper segment between the outer and inner cylinders, means for withdrawing the liquid condensate from approximately that end of the column away from which the secondary and primary vapor flow, means for withdrawing uncondensed vapor from approximately the other end of the column, means for liquefying the remaining constituents of the vapor mixture to be separated which are contained in this vapor withdrawal product, and means for recycling the remaining portion of vapor to the end of the column away from which the vapor is flowing.

36. A differential column for concentrating a component of a primary vapor mixture by differential diffusion through a secondary vapor comprising an outer cylinder, an inner cylinder substantially concentric with said outer cylinder, the co-extensive length of the two cylinders being greater than the difference between their radii, means for heating the outer cylinder, means for cooling the inner cylinder, a dividing member shaped to retain liquid on its upper surface, said dividing member being positioned between said inner and outer cylinders in such a manner that the liquid retained by the dividing member will be beneath said inner cylinder, a baffle plate substantially co-extensive with at least one of said inner and outer cylinders, said plate being positioned within the outer cylinder and to one side of the inner cylinder, said plate extending to a point between the inner cylinder and the dividing member and below the surface of liquid formed during operation on the upper surface of the dividing member, means for establishing a longitudinal flow of secondary vapor and primary vapor mixture in the upper segment between the outer and inner cylinders, means for withdrawing the liquid condensate from approximately that end of the column away from which the secondary and primary vapor flow, means for withdrawing uncondensed vapor from approximately the other end of the column, means for removing the remaining constituents of the vapor mixture to be separated which are contained in the vapor withdrawal product, means for recycling the remaining portion of vapor to the end of the column away from which the vapor is flowing, and means for refluxing at least a portion of the recovered primary vapor mixture into at least one end of the column.

MARIO T. CICHELLI.

References Cited in the file of this patent

UNITED STATES PATENTS

| Number | Name | Date |
|---|---|---|
| 1,881,490 | Gmelin et al. | Oct. 11, 1932 |
| 2,255,069 | Maier | Sept. 9, 1941 |

FOREIGN PATENTS

| Number | Country | Date |
|---|---|---|
| 270,286 | Great Britain | Apr. 23, 1927 |